Dec. 10, 1968 S. HELLER ET AL 3,416,154

DATA DISK STRUCTURE AND ROTATABLE MOUNTING THEREFOR

Filed Jan. 14, 1966 2 Sheets-Sheet 1

INVENTOR.
STANLEY HELLER
WILLIAM F. ANDERSON
ROBERT B. BERLIN

BY Curtis Ailes

ATTORNEY.

United States Patent Office
3,416,154
Patented Dec. 10, 1968

3,416,154

DATA DISK STRUCTURE AND ROTATABLE MOUNTING THEREFOR

Stanley Heller, Philadelphia, Pa., and William F. Anderson, Peekskill, and Robert B. Berlin, Yorktown Heights, N.Y., assignors to Itek Corporation, a corporation of Delaware Filed Jan. 14, 1966, Ser. No. 520,741
12 Claims. (Cl. 346—137)

ABSTRACT OF THE DISCLOSURE

In particular there is disclosed a design and method of assembly for a glass disk having a metal sleeve attached to a centrally mounted resin insert.

Figure 1:
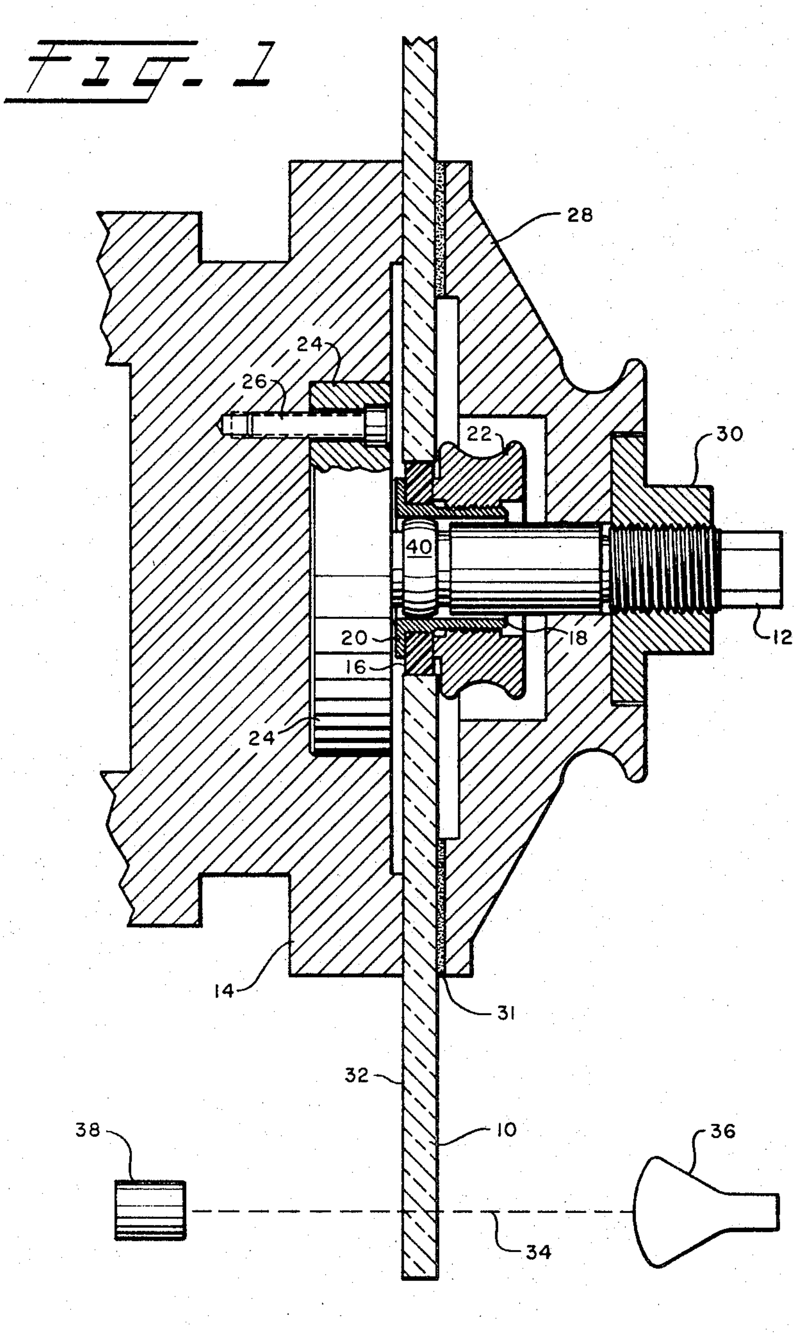

This invention relates to improved data disk structures, and particularly to improvements in features relating to the accurate and precise positioning and mounting of such disks.

The invention is particularly applicable to high density optical data storage systems. Such systems usually employ photographic techniques to record information in the form of alternate light and dark areas on photosensitive surfaces of disks. The light areas may be transparent and the dark areas absorptive or reflective. The presence of a light or dark area indicates a binary zero or a binary one. Alternatively, a light-dark sequence may indicate one digit, with the other digit indicated by a dark-light sequence. Information is retrieved from the recording medium by passing it through a light beam and thus scanning, by means of a photo-detector on the opposite side of the medium, the succession of light and dark areas. Alternatively, the difference in reflectivity of light and dark areas may be employed.

The density of data storage in systems of the above description, as achieved up to the present time, has been remarkably high, and the data tracks and data marks have been made exceedingly small to accomplish these results. In order to provide completely satisfactory operation with the high density storage, it is absolutely essential to provide extreme accuracy in the positioning of all of the optical components of the system. This includes the accurate positioning of the data disk itself, in particular. This problem, particularly with respect to the data disk has not been completely solved in the past. Furthermore, higher and higher data densities are being used. This is demonstrated, for instance, in a co-pending U.S. patent application Ser. No. 423,801, filed on Jan. 6, 1965 by Claus M. Aschenbrenner, Hsueh Y. Hsieh, and Richard L. Libby, for a "Data Storage Method and Apparatus" and assigned the same assignee as the present application. In that application, a system is described in which a ten and one-half inch diameter data storage disk contains 3,000 separate data tracks with an average center-to-center radial displacement between data tracks of only about 0.0003 inch. It is quite apparent that, with such high data densities, accurate centering of the data disk is extremely important. Otherwise, the radial distance of the data track from the center of the disk will vary as the disk rotates, and accurate optical reading of the data will be very difficult and possibly unreliable. This statement assumes circular data tracks, but similar problems are encountered with spiral data tracks.

In order to maintain accurate focusing of the optical elements of the system, it is also quite important that the surface of the data disk should be very smooth, and rotatable with the surface essentially in a plane perpendicular to the axis of rotation. Furthermore, the disk must have good optical properties. One of the best materials for the disk, which combines good optical properties, rigidity, dimensional stability, and optical accuracy, is glass. However, it has been found to be very difficult to provide a glass data disk structure which is capable of being very accurately centered in position in optical data storage apparatus. In particular, it is exceedingly difficult to produce an inexpensive glass disk having a center opening which is perfectly round and which therefore can be reproduceably positioned over a centering pin structure. Furthermore, the edges of a center opening provided in a glass disk are subject to chipping and undue wear in repeated assembly and disassembly from the data utilization apparatus.

Accordingly, it is one object of the present invention to provide a data disk structure having good optical properties which is conveniently positioned and held in a very precise manner.

Another object of the present invention is to provide a data disk structure employing a glass data disk body, and which is capable of being precisely positioned and held for detection of the data, and repeatedly assembled and disassembled from a rotatable mounting without undue wear.

One of the best methods for accomplishing repetitive positioning of a data disk in a precise manner without encountering undue wear is to provide the data disk with a metal sleeve at the center opening thereof. However, many problems are encountered in providing this objective. For instance, it is difficult to attach a metal sleeve securely to a glass data disk without injuring the glass through forces exerted from the metal sleeve. Furthermore, differences in thermal expansion create very serious problems since the attachment must be very secure and unyielding.

Accordingly, it is another object of the invention to provide a data disk structure having a glass body and a metallic center sleeve with a satisfactory solution to the attachment of these two components.

It is another object of the invention to provide a glass data disk with a metallic center sleeve in which the center sleeve stucture provides a convenient handle on at least one side of the data disk.

While a handle feature for the metal sleeve is very convenient, it is quite inconvenient to apply the photographic emulsion to the glass disk with a metal sleeve and protruding handle attached thereto. However, after the emulsion has been applied to the disk, the disk must be protected from exposure to light until the data is to be optically recorded.

Accordingly, it is another object of the invention to provide a metal sleeve and handle structure for a glass data disk which is easily assembled to the disk under dark room conditions.

Other objects and advantages of the invention will be apparent from the following description and the accompanying drawings.

In carrying out the invention in one preferred form thereof, a data disk may be provided by producing a circular glass disk having optically flat parallel faces and a central aperture therein and producing a resin insert disk having an outside diameter of the glass disk, cementing the resin disk in an axially centered position within the center opening of the glass disk, drilling a hole in the resin insert disk which is centered with respect to the outside diameter of the glass disk, and applying a photographic emulsion to one side of the glass disk.

In a preferred form of the invention, a metal sleeve is inserted and clamped within the opening of the resin insert so that the metal sleeve engages only the resin insert.

In a preferred mounting for the disk, there is provided a stud having a maximum outer diameter defined by a spherical surface having a close fit within the center opening of the metal sleeve to provide accurate centering thereof.

In the accompanying drawings:

FIGURE 1 is a side view, partially in section, illustrating a data disk structure assembled upon a rotatable mounting in accordance with the present invention.

Figure 2:
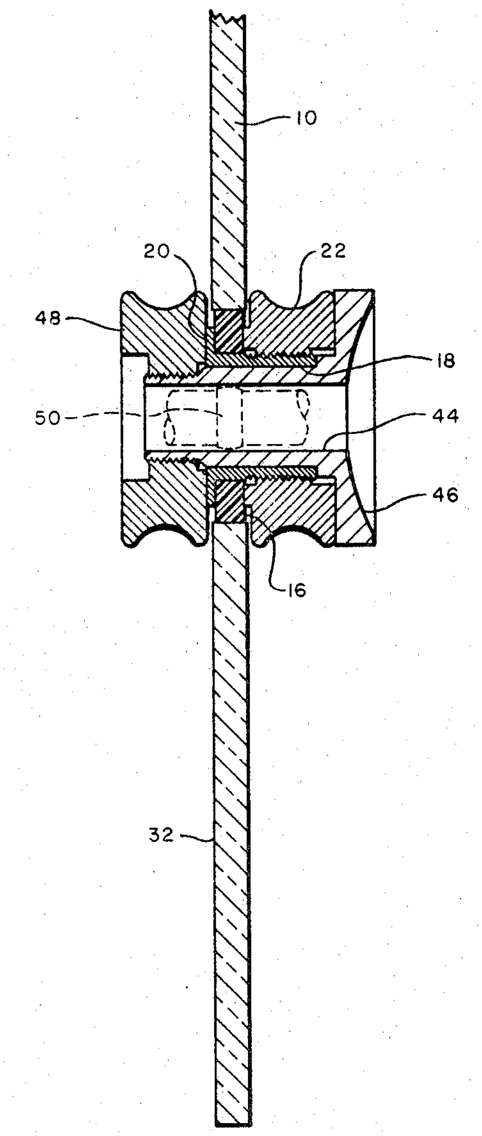

And FIGURE 2 illustrates the data disk structure of FIGURE 1 after removal from the rotatable mounting, and with the installation of an auxiliary metal sleeve including an auxiliary handle.

Referring in more detail to FIGURE 1, there is shown a side view, partially in section, illustrating a preferred embodiment of the invention. A glass data disk 10 is centered upon a mounting stud 12, which in turn is fastened to a rotatable spindle 14. Disk 10 is supported upon an annular surface at the outer periphery of spindle 14. The data disk 10 includes a resin center insert 16 and a metal sleeve 18 fitted within the resin insert. The sleeve 18 includes an integral flange 20 which grips one side of the resin insert, and a screw-threaded flange 22 which grips the other axial end of the resin insert, and which also forms a handle for the data disk.

The stud 12 is provided with a large end flange 24, by means of which the stud is securely fastened to the spindle 14. Suitable threaded fastenings are employed for this purpose, such as indicated at 26.

The data disk is securely retained upon the stud 12 by means of a clamp member 28 secured by a threaded nut 30 which engages the outer threaded portions of the stud 12.

At its largest diameter, the clamp member 28 is provided with an annular face having a non-metallic ring pad 31 by means of which it engages and clamps the glass disk 10 against a corresponding portion of the spindle member 14. The pad 31 may be composed of various different materials which will provide a cushioning effect to avoid breaking and marring the glass disk 10. A very good material for this purpose has been found to be cork. A similar pad may be provided on the face of the spindle 14 which engages the glass disk. But this has been found to be unnecessary, and it is preferable to avoid it in order to have the glass disk precisely positioned against the metal face of the spindle 14 with no risk of dimensional variation due to a greater or lesser compression of a resilient pad.

The photographic emulsion and the optically recorded data are preferably provided at 32 on the side of the data disk which is nearest the spindle and at the outer radial portions of the disk. The data is read by means of a light beam schematically indicated at 34 from a light source 36, which is received by a detector 38, such as a photomultiplier tube. It will be understood that the elements 34, 36, and 38 are only schematically shown. In a practical system, considerable additional apparatus is involved to focus the light beam 34 to a particular data track, including focusing lenses which may be controllably positionable and which are not shown here.

While the optically effective portions of the data disk are composed entirely of glass, plus the photographic emulsion, the centering of the disk involves physical engagement of only the metallic portion of the disk with the mounting stud 12. The metallic portion referred to is the sleeve 18. Sleeve 18 is very securely fastened to the disk by a tight physical clamping upon the resin insert 16 by flanges 20 and 22, without direct physical engagement with the glass portion of the disk. By confining the physical clamping forces of the metal sleeve 18 to the resin insert, the sleeve can be rigidly and permanently attached to the data disk without any risk of chipping or injury to the glass portions of the disk. The inner surface of sleeve 18 has a close tolerance centering fit over an integral flange 40 of stud 12. Flange 40 has a spherical outer surface.

The resin insert 16 may be composed of any one of a number of different commercially available tough and dimensionally stable materials. These may include phenolics, epoxies, polyesters, polycarbonates, or others. The polycarbonates have been found to be particularly effective for this purpose, and are preferred because of their strength and toughness and dimensional stability.

The resin insert 16 is preferably cemented into the central opening of the glass data disk 10 by means of a toughly adherent resinous cement. A good quality of commercial thermosetting epoxy cement is preferred for this purpose. When such a cement is used, the bond of the resin insert to the glass is often stronger than the coherent strength within the body of the material of the resin insert itself. An epoxy cement is therefore preferred for this purpose. The epoxy cement is thought to be particularly effective with the polycarbonate material which is preferably used as the resin insert 16 because of their similar chemical characteristics. The preferred polycarbonate material may be described as a reaction product of bisphenol A and phosgene and the epoxy resin may be described as the reaction product of bisphenol A and epichlorohydrin. The polycarbonates are generally characterized by long chain polymeric molecules built up from elemental combinations of $CO_3$. These materials are described in some detail in a book entitled, "Polycarbonates" by Christopher and Fox, published by Reinhold Publishing Company in 1962. A typical commercially available carbonate is available from the General Electric Company under their trademark name "Lexan" and under their product designation "101 Polycarbonate."

The preferred method of producing the data disk is as follows: First, the glass body of the disk 10 is produced having a circular outer periphery, a circular inner opening, and optically flat faces. Next, a resin insert disk having no center hole is securely cemented into the center opening of the glass disk by means of a suitable cement, as described above. The resin insert is somewhat thinner from face to face than the glass disk and it is preferably cemented so that its faces are parallel (as nearly as possible) with the faces of the glass disk, and centered within the opening of the glass disk so that each face of the resin insert is positioned inwardly somewhat from the level of the adjacent face of the glass disk. The center hole for the metal sleeve 18 is then carefully drilled in the resin insert 16. The position of the hole is carefully centered with respect to the outer circumference of the glass disk 10.

It has been found to be quite difficult to produce a glass disk having a center opening which is exactly positioned in the center of the glass. It has also been found to be very difficult to provide a center opening in a glass disk which is perfectly round, and which therefore provides good centering for the mounting of the disk upon the stud 12. Accordingly, it is to be appreciated that the insertion of the resin insert 16, and the subsequent drilling of the center hole after assembly, provides the function of assuring an opportunity of improving the roundness and centering of the mounting hole at the center of the data disk, in addition to providing a material at the center hole which is capable of withstanding the physical forces of the attachment of the metallic sleeve 18.

The next step in the process of producing the data disk is the application of the photographic emulsion. This is applied in a conventional manner to one side of the glass disk. From this point on, until the photographic exposure and development of the optical image, the disk must be handled under "dark room" conditions. The limited axial dimension of the resin insert 16 is particularly important in the process of applying the emulsion for it assures that the glass disk body can be handled in the emulsion application machinery as essentially a flat emulsion holding substrate. It has been found to be quite impractical to apply the emulsion to substrates having axial protrusions which extend beyond the faces of the glass portion of the data disk. It is for this reason that the sleeve 18, with its protruding flanges, is assembled to the disk after the application of the emulsion. It is one of the important features of the structure of the disk, and the process of producing the finished disk, that the sleeve 18 is of such simple construction that it is easily assembled to the disk under dark room conditions. The threaded portion of the sleeve 18 is simply inserted through the central opening of the resin insert 16 until the closely fitted and unthreaded portion of the outer cylindrical surface of the sleeve body engages snugly within the insert center opening, and the permanent flange 20 is engaged with the axial end of the resin insert 16. The threaded flange (handle) 22 is then screwed onto the threaded portion of the flange body and tightened. The data disk is then complete and ready for the storage of data by optical exposure and development of the photographic emulsion. The emulsion side of the disk may be identified for easy detection by touch for assembly of the sleeve by providing a notch or indentation on one side of the resin insert.

The inner surface of the metal sleeve 18 is very carefully machined to close tolerances in order to provide for repeated accurate centering of the data disk upon the mounting stud 12. It is a particularly important feature of the present invention that the stud 12 is provided with the special flange indicated at 40 on which at least the outer edge or crown portion is defined by a spherical surface, and which has an outer pheripheral dimension providing a very close tolerance fit with the inner surface of the sleeve 18. For instance, in an actual embodiment, the diametral clearance varies from only 0.0001 to 0.0005 inch. The center of the sphere of the spherical surface preferably lies very close to the center plane of the data disk.

The employment of thespherical surface for the positioning flange 40 accomplishes several important purposes. It accommodates for any small axial misalignments between the disk and stud 12 after assembly when the disk is firmly clamped. It must be emphasized, however, that because the center of the spherical surface of flange 40 lies in or near the center-line of disk 10 when in assembled relationship, the axial misalignments are accommodated without sacrificing any accuracy in the centering of the disk upon the stud 12. The disk 10 is thus accurately positioned in the assembled relationship illustrated in FIGURE 1. It is clamped by its axial faces by engagement between the outer edges of the spindle 14 and the clamping member 28, and it is centered by engagement of the sleeve 18 over the spherical flange 40. It is a particularly important feature of the assembly that no rotational stress, or bending moment of force is applied to the resin insert 16 through the sleeve 18 and its flanges 20 and 22. This is true because the sleeve, and its flanges are not engaged at all by either the spindle 14 or the clamping member 28, the only engagement of the sleeve and its parts by the disk mounting spindle and associated parts is at the spherical surface of the flange 40. Thus, there may be a substantial misalignment of the resin insert away from the true axis of the disk 10 without causing any serious or detrimental consequences. If the clamping parts, such as clamping member 28 did engage with the metal sleeve parts such as the flange (handle) 22, in the presence of a misalignment of the insert 16, there would be a substantial bending stress applied to the insert which would tend to break the insert or cause a loosening of the bond of the insert to the glass disk.

The spherical flange 40 also provides a much closer tolerance fit with the inside cylindrical surface of the sleeve 18 than it would be possible to employ with a straight cylindrical body portion of the stud 12. This is not due to limitations in the ability to machine cylindrical surfaces to close tolerances, but it is involved with the problem of ease of assembly and disassembly. If the system in which the data disks 10 are employed is to be useful, then it must be possible to rapidly and efficiently change from one disk to another. Therefore, ease and rapidity in assembly and disassembly are very essential. At the same time, precise accuracy in centering the disk upon the stud is absolutely vital. The spherical flange 40 accomplishes these purposes very well. It promotes ease of assembly because it accommodates for axial misalignments of a minor nature between the disk and the stud 12 during assembly. If a straight cylindrical stud were provided, having a close tolerance fit with the sleeve throughout its axial length, then the stud and sleeve would have to be perfectly aligned before the disk and its sleeve could be assembled over the stud. With the present arrangement, only an approximate axial alignment is necessary, and the sleeve slides over the spherical flange very easily, just as it would over a steel ball of corresponding size.

It is very desirable to have the glass disk of the present invention centered upon the stud, with respect to its outside circumference, in order to try to achieve reasonable dynamic balance when the data disk is rotating at high speed. However, the most important optical consideration is simply to be able to repetitively position the disk on the spindles of various machines, using the same disk center for recording data and for each later reading of the data. The center hole and the optical center therefore may be displaced from the actual physical center of the disk (with respect to the outer circumference) if the mechanical imbalance can be tolerated. The present invention, however, can be employed to solve both problems.

In the preceeding discussion, it has been suggested that the center of the sphere defining the spherical surface 40 should be at, or near, the center plane of the glass disk. This is best for achieving the most complete physical centering of the mass of the disk. However, for optical purposes, the most important consideration is to provide a consistent dimension from the surface of the face of the spindle 14, against which the disk rests, to the center of the sphere defining the spherical surface 40. If this dimension is consistent on the disk studs of all machines, then the disks may be interchangeably mounted on any machine, and they are appropriately recentered, from an optical standpoint, with respect to the recorded data.

FIGURE 2 illustrates the data storage disk structure of FIGURE 1 together with an auxiliary sleeve 44 having an integral end flange 46 and a screw threaded end flange 48, which also provides an auxiliary handle. With the auxiliary sleeve 44 a smaller mounting stud is employed with a smaller size spherical positioning flange as indicated in phantom at 50.

In some embodiments of apparatus employing the disk structure according to this invention, it is very desirable in the procedure of photographically storing the information on the data disk to have a handle, such as the handle flange 48, upon the emulsion side of the disk 10. It has been found to be very convenient to provide the handle 48 by means of the auxiliary sleeve 44 which may be removed after the data has been stored upon the disk. Thus, the disk may be employed with the single sleeve and single handle throughout the remainder of its life while data is read from the disk. The outer radius of the body of the sleeve 44, which engages with the inner radius of the sleeve 18, is dimensioned to provide a close fit and accurate centering of the disk. Furthermore, the spherical flange 50 is produced with a very close tolerance fit to the inside diameter of the sleeve 44. This spherical flange provides the same advantages as explained above for the spherical flange 40 of mounting stud 12. That is, it allows for ease of assembly over the mounting stud without any sacrifice in positioning accuracy, and it accommodates for any slight axial misalignment between the spindle 14 and the sleeve 44.

A special feature of the sleeve 44 is that the end surface of the integral flange 46 has a dished shape. This provides a difference between the handle flange 48 on the emulsion side of the disk and the handle flange 22 on the other side of the disk which is easily recognizable by touch under dark room conditions.

For convenience in illustration, both of the drawings show the data disks with a horizontally aligned axis. However, it will be understood that the axis may be aligned in any direction. It is generally considered preferable, in the data reading apparatus illustrated in FIGURE 1, to mount the data disk with the axis vertical, with the spindle 14 beneath the disk, and the clamping member 28 above the disk. This arrangement has the advantage that the disk is easily and simply lowered into position over the spindle 12, and securely held by gravity in the assembled position while the clamp 28 and nut 30 are assembled over the spindle 12.

We claim:

1. An optical data disk structure comprising
A. a glass disk having optical data storage material on at least one surface thereof,
(1) said glass disk having a center opening therein,
B. a polymeric organic resin insert securely attached within the center opening of said glass disk,
(1) said resin insert having a center opening,
C. a metal sleeve secured within said opening in said resin insert,
(1) the attachment of said metal sleeve being made only to said resin insert.

2. An optical data disk structure comprising:
A. a glass disk having optical data storage material on one surface thereof,
(1) said glass disk having a central opening inaccurately centered therein with respect to the outer disk circumference;
B. a disk of resinous material securely attached to the entire inner diameter at the central opening of said glass disk,
(1) said resin insert having a central opening therein which is centered with respect to the outer circumference of said glass disk; and
C. a metal sleeve securely attached to said resin insert and extending through the central opening thereof.

3. A data disk in accordance with claim 2 in which
A. said metal sleeve includes flanges on each axial end thereof which embrace said organic resin insert,
(1) at least one of said flanges having a threaded fastening to the remainder of said sleeve,
(2) said last-mentioned flange having a substantial axial length and forming a handle for said disk when assembled thereto.

4. A disk structure in accordance with claim 2 in which said organic resin insert is composed essentially of a polycarbonate.

5. A data disk structure in accordance with claim 2 in which said resin insert is securely attached within the center opening of said glass disk by means of a resinous cement.

6. A data disk structure in accordance with claim 5 in which said resinous cement is an epoxy cement.

7. A data disk is accordance with claim 2 in which
A. said resin insert has a thickness which is less than the thickness of said glass disk, and in which
B. said insert is axially centered within the center opening of said glass disk.

8. A data disk and mounting combination comprising a data disk as set forth in claim 2 and mounting structure comprising a stud having a maximum outer diameter defined by a spherical surface having a close fit within the center opening of said metal sleeve of said data disk to provide accurate centering thereof.

9. A data disk and rotatable mounting combination comprising a data disk as set forth in claim 2 and a mounting structure comprising,
A. a rotatable spindle having an annular planar face thereon arranged in a plane perpendicular to the axis thereof,
(1) said spindle including a mounting stud extending along said axis beyond said plane,
(a) said mounting stud including an integral flange portion having a spherical outer surface arranged to center said disk upon said stud by a closely-fitting relationship of said spherical surface within said metal sleeve,
B. a clamp member having an annular face with dimensions similar to the dimensions of the annular face of said spindle,
(1) said clamp member having a center opening for mounting over said stud with said annular face thereof clamped against said disk to thereby clamp said disk between said annular face of said clamp member and said annular face of said spindle.

10. A photographic data record disk and rotatable mounting combination comprising:
A. a data disk in accordance with claim 2,
B. a rotatable spindle having an annular face defined by a plane perpendicular to the axis of the spindle and arranged to support said data disk thereagainst,
(1) said spindle including a center stud extending along the axis thereof beyond said annular face,
(a) the maximum outer diameter of the body of said stud being defined by an integral flange upon said stud having a spherical outer surface,
(b) the center of the sphere of said spherical surface being positioned out from the plane of said annular face of said spindle by a dimension equal to one-half of the thickness of said data disk,
(c) the outer diameter of said spherical surface being defined to provide a close tolerance fit within the center opening of said data disk,
C. an annular clamp member having a center opening and arranged to be assembled over said mounting stud,
(1) said clamp member including an annular face arranged in a plane perpendicular to the axis thereof and arranged to engage and clamp said data disk against said annular face of said spindle.

11. A rotatable support for a photographic data record disk comprising
A. a rotatable spindle having an annular face defined by a plane perpendicular to the axis of the spindle and arranged to support a data disk thereagainst,
(1) said spindle including a center stud extending along the axis thereof beyond said annular face,
(a) the maximum outer diameter of the body of said stud being defined by an integral flange upon said stud having a spherical outer surface,
(b) the center of the sphere of said spherical surface being positioned out from the plane of said annular face of said spindle by a dimension equal to one-half of the thickness of the record disk to be supported,
(c) the outer diameter of said spherical surface being defined to provide a close tolerance fit within the center opening of a record disk to be supported, B. an annular clamp member having a center opening and arranged to be assembled over said mounting stud, (1) said clamp member including an annular face arranged in a plane perpendicular to the axis thereof and arranged to engage and clamp a data disk to be supported against said annular face of said spindle.

12. A support structure in accordance with claim 11 in which at least one of said annular faces is provided with a non-metallic cushion.

References Cited

UNITED STATES PATENTS

| | | | |
|---|---|---|---|
| 2,283,797 | 5/1942 | Dech | 274—42 |
| 3,076,959 | 2/1963 | Pong | 340—347 |
| 3,187,187 | 6/1965 | Wingate | 250—233 |

RICHARD B. WILKINSON, *Primary Examiner.*

JOSEPH W. HARTARY, *Assistant Examiner.*

U.S. Cl. X.R.

156—293; 29—406